United States Patent [19]

Fahrenschon

[11] 4,352,406
[45] Oct. 5, 1982

[54] SELECTIVELY ENGAGEABLE AND DISENGAGEABLE DRIVE FOR WHEELED DEVICES SUCH AS GRAIN AUGERS OR THE LIKE

[76] Inventor: Anthony Fahrenschon, No. 10 Highway East, Swan River, Manitoba, Canada, R0L 1Z0

[21] Appl. No.: 175,145

[22] Filed: Aug. 4, 1980

[51] Int. Cl.³ ............................................. B60K 7/00
[52] U.S. Cl. ..................................... 180/308; 180/74; 180/243
[58] Field of Search ................... 180/308, 65 A, 65 E, 180/65 D, 65 F, 72, 74, 242, 243, 245, 246, 61, 10, 55, 54 F; 280/206

[56] References Cited

U.S. PATENT DOCUMENTS

| | | | |
|---|---|---|---|
| 2,399,778 | 5/1946 | Wike | 180/10 |
| 2,798,565 | 7/1957 | Rosenthal | 180/74 |
| 3,094,186 | 6/1963 | Lappin | 180/10 |
| 3,265,147 | 8/1966 | Coordes | 180/65 F |
| 3,675,730 | 7/1972 | Kontranowski | 180/55 |

FOREIGN PATENT DOCUMENTS 916581 10/1946 France ............................. 180/65 F

*Primary Examiner*—David M. Mitchell

*Attorney, Agent, or Firm*—Stanley G. Ade

[57] ABSTRACT

A hydraulic gear motor is supported by supporting structure secured to an axle adjacent a ground engaging wheel. The support structure is pivotally mounted upon a bolt or shaft extending upwardly from the supporting structure and the hydraulic motor, together with a sprocket driven thereby, is capable of vertical movement on the bolt or shaft and is held in the uppermost position by means of a detachable lock pin through the bolt or shaft. A length of sprocket chain is secured in the form of a circular track, to adjacent the rim of the wheel and concentric with the rotatable axis thereof. When the hydraulic motor and sprocket are in the uppermost position, the sprocket engages the inner surface of the chain whereby rotation of the sprocket, rotates the ground engaging wheel. A pivotal retaining bracket holds the hydraulic motor in the innermost position when the sprocket engages the chain. When the drive is to be disengaged, the lock pin is removed so that the hydraulic motor and the sprocket drop downwardly and disengage from the chain and, if necessary, the pivotal bracket is swung clear of the support structure so that the hydraulic motor and sprocket can be swung free in a horizontal plane.

11 Claims, 4 Drawing Figures

U.S. Patent
Oct. 5, 1982
4,352,406
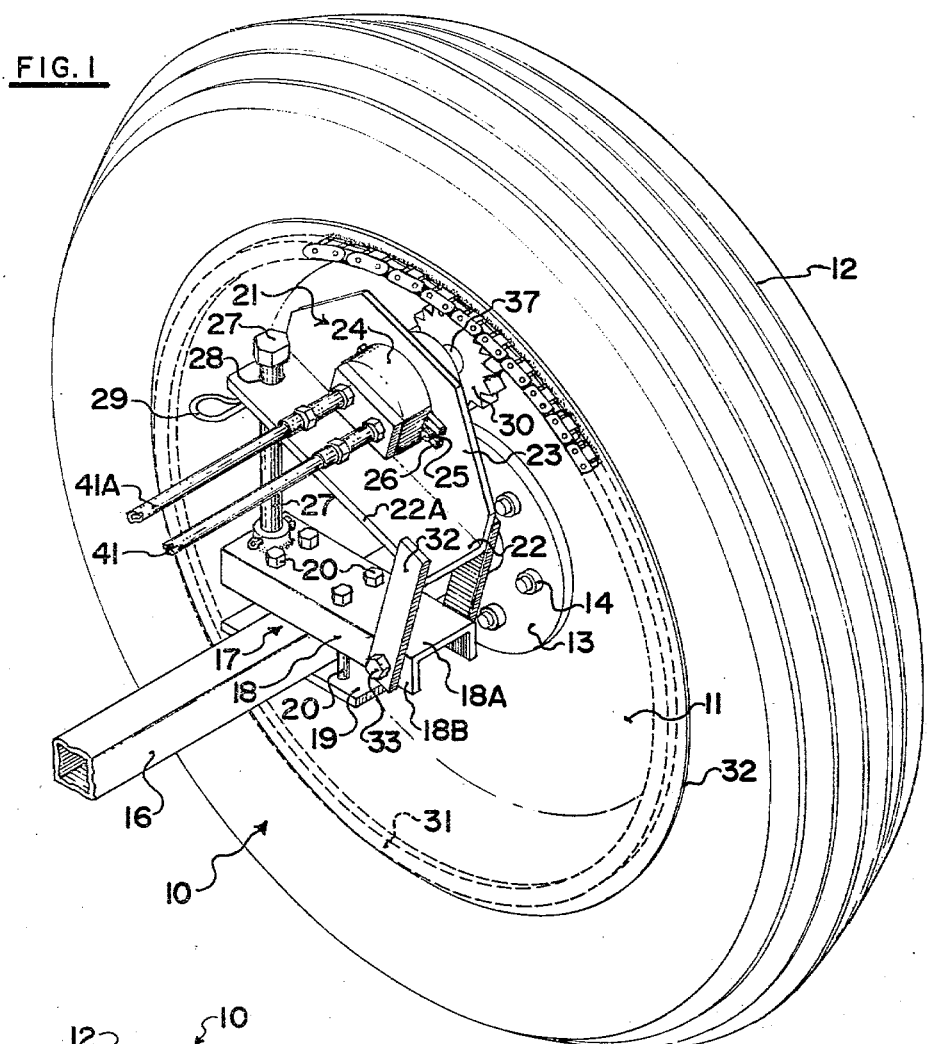
FIG. 1
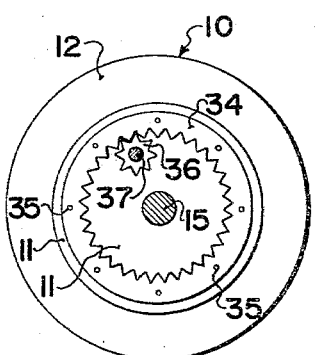
FIG. 2
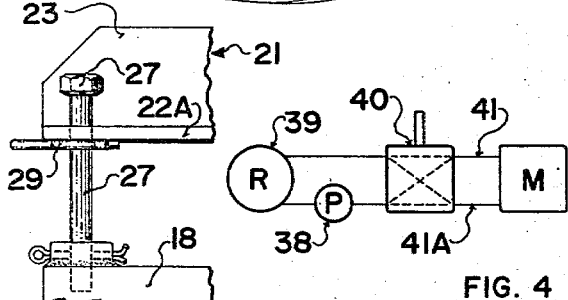
FIG. 3
FIG. 4

SELECTIVELY ENGAGEABLE AND DISENGAGEABLE DRIVE FOR WHEELED DEVICES SUCH AS GRAIN AUGERS OR THE LIKE

BACKGROUND OF THE INVENTION

This invention relates to new and useful improvements in devices for selectively driving a device and although it is primarily for use with a grain auger assembly, nevertheless it can readily be adapted for use on other farm implements and the like in which there is a requirement to move such implements relatively short distances instead of having to hitch them to a tractor or other source of motive power.

For example, with the relatively large grain auger assemblies in common use on grain farms and the like, it is often desirable to manipulate or move the grain auger assembly from one location to another in order that the loading or unloading of grain to or from grain storage bins, may be undertaken. Such relatively large grain auger assemblies are difficult to manoeuver manually and many attempts have been made to incorporate additional drive wheels which can be engaged with the ground in order to facilitate this manipulation in relatively confined areas.

Such devices suffer from several disadvantages, the principal one of which is the fact that the selectively enengageable drive wheel has to be mounted in a frame suspended from the undercarriage of the grain auger assembly, it has to be provided with means to raise and lower the wheel out of and into contact with the ground, it has to be provided with a castoring or steering assembly so that the operator may direct the movement of the grain auger assembly across the ground, and it has to be provided with a source of power, the control of which is by the operator who is attempting to steer the device as well as to control the speed and final positioning of the assembly.

SUMMARY OF THE INVENTION

The present invention overcomes these disadvantages by providing a hydraulic motor which is mounted upon a simple bracket assembly on the inside of each of the ground engaging wheels of the undercarriage of a grain auger assembly or other farm implement. The two hydraulic motors are connected to a source of hydraulic fluid under pressure and may easily be controlled by means of conventional valves with the steering being controlled by sending fluid to one wheel or the other.

Furthermore, means are provided to operatively engage or disengage the hydraulic motor with the ground engaging wheels so that the hydraulic motors may either drive the wheels or, alternatively, may be disengaged so that the implement may be towed by a tractor in the usual way.

In accordance with the invention there is provided selectively engageable drive means for a ground engaging wheel mounted upon an axle component and comprising in combination a support bracket, a source of power mounted on said bracket, means rotatable by said source of power, further means on said ground engaging wheel selectively engageable and disengageable with said means rotatable by said source of power, to selectively drive said ground engaging wheel, and means mounting said bracket to said axle component for selective engagement and disengagement of said means rotatable by said source of power, to said further means on said ground engaging wheel.

Another advantage of the invention is to provide a device of the character herewithin described which is easily attached or detached from conventional ground engaging wheel assemblies via the axle component thereof.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is an isometric view of the invention attached to an axle component upon which a ground engaging wheel is mounted.

FIG. 2 is an inside elevational view of a ground engaging wheel showing an alternative drive means.

FIG. 3 is a fragmentary side elevation of the mounting post showing the lock pin in position.

FIG. 4 is a schematic view showing the hydraulic circuit.

In the drawings like characters of reference indicate corresponding parts in the different figures.

DETAILED DESCRIPTION

Proceeding therefore to describe the invention in detail, FIG. 1 shows the inside view of a ground engaging wheel assembly collectively designated 10 including a wheel rim component 11 having a pneumatic tire 12 mounted thereon with the rim being secured to a conventional back plate 13 by means of wheels bolts 14, with the hub being journalled for rotation upon a fixed spindle 15 (see FIG. 2) supported upon the end of an axle beam 16, all of which is conventional. In the claims, the axle beam 16 together with the spindle 15 is defined as an axle component.

Supporting structure collectively designated 17 is provided and secured to the axle beam 16 adjacent the outer end thereof and adjacent the wheel assembly 10. In this embodiment, the supporting structure includes a short length of channel 18 extending transversely across the wheel beam 16 and being clamped to the wheel beam by means of a base plate 19 spanning the axle beam 16 upon the underside thereof and being secured to the channel by means of nut and bolt assemblies 20.

A support bracket is provided collectively designated 21 and in this embodiment, the support bracket includes a substantially horizontally situated base plate 22 with a vertical flange 23 extending upwardly from the outer edge thereof. It may be formed from a length of angle iron suitably shaped as illustrated with the horizontal base flange 22 facing inwardly away from the wheel assembly 10. A hydraulic motor 24, of conventional construction, is bolted to the inner surface of the vertical flange 23 by means of bolts 25 extending through the open ended slots 26 provided on each side of the hydraulic motor (only one of which is shown).

The support bracket together with the hydraulic motor are supported on the support structure by means of a vertically situated fixed member 27. In the present embodiment, this fixed member takes the form of a bolt acting as a spindle or shaft, with the bolt extending through an aperture 28 formed through the horizontal flange 22 of the support bracket and adjacent one end thereof as clearly shown. The mounting of the support bracket and the hydraulic motor upon the bolt 27 is such that the support bracket and motor may be moved vertically up and down the bolt from a position defined as a ground engaging wheel driving position illustrated in FIGS. 1 and 3 to a ground engaging wheel disengaged position (not illustrated) and vice-versa.

Means are provided to selectively maintain the bracket and motor in the ground engaging driving position, said means taking the form of a spring clip or lock pin 29 engageable through a aperture bracket (not illustrated) in the bolt 27 so that the bracket rests upon the lock pin 29 when in the position shown in FIGS. 1 and 3. However, if the lock pin 29 is disengaged, the support bracket and the hydraulic motor may be dropped downwardly to rest upon or adjacent to the web 18A of the channel 18 forming part of the supporting structure 17.

The hydraulic motor extends through an aperture in the vertical flange 23 of the support bracket and is provided with means rotatable by the hydraulic motor. In the preferred embodiment, this takes the form of a sprocket wheel 30 rotatable by the motor when the motor is operating.

Means are provided on the wheel assembly 10, selectively engageable by the sprocket 30 in order to selectively rotate the ground engaging wheel assembly 10 and FIG. 1 shows a length of sprocket chain 31 formed in a circle and secured to adjacent the rim 32 of the rim component 11 of the wheel assembly as by welding or the like, and it should be observed that this chain circle 31 is positioned concentrically with the axis of rotation of the wheel.

When the bracket assembly and motor are in the ground engaging wheel driving position illustrated in FIGS. 1 and 3, the sprocket is operatively engaged with the inner surface of the chain circle 31 so that rotation of the hydraulic motor in either direction, rotates the ground engaging wheel. However, when the lock pin 29 is disengaged, the support bracket and motor drop downwardly thus disengaging the sprocket 30 from the chain under which circumstances the assembly is said to be in the ground engaging wheel disengaged position.

Means are provided to selectively guide the movement of the support bracket and the hydraulic motor along the length of the shaft or spindle 27, said means taking the form of a retaining plate 32 bolted by adjacent one end thereof to the innermost vertical flange 18B of the channel 17 and extending upwardly to engage the inner side or edge 22A of the horizontal flange 22 of the support bracket as clearly illustrated. This ensures that the sprocket 30 engages the chain circle 31 when it is moved upwardly.

However, it may be desirable to swing the entire assembly clear of the wheel when it is desired to tow the implement by means of a tractor or any other conventional means under which circumstances the bolt 33 clamping the retainer plate 32 in position, may be loosened so that it can be swung downwardly clear of the support bracket thus enabling the support bracket after it has been lowered clear of the chain circle 31, to be swung inwardly or pivoted upon the bolt 27 so that it lies substantially parallel with the axle beam 16.

FIG. 2 shows an alternative drive method which includes an internally toothed ring gear 34 bolted to the rim of the wheel assembly 10 by means of bolts 35 also concentrically with the axis of rotation of the wheel and having a gear 36 operatively secured to the spindle 37 of the hydraulic motor and selectively engageable with the internally toothed gear 34.

FIG. 4 shows a schematic view of the hydraulic circuit which includes an hydraulic pump 38, a fluid reservoir 39 operatively connected thereto, an adjustable speed and reversing valve assembly which is conventional, and the two hydraulic hoses 41 and 41A extending from the hydraulic motor to the selector valve 40, all of which is conventional.

In operation, it will be appreciated that most implements are provided with two ground engaging wheels, one upon each side of the undercarriage thereof (not illustrated) so that an embodiment of the invention is secured to each end of the axle beam 16 adjacent each wheel. The operator is provided with two selector valve assemblies 41 for each wheel whereby he can control the speed and direction of the drive to each thus enabling him to manipulate the implement readily and easily with the pump being driven either by a source of power (not illustrated) on the implement or an auxiliary one selectively connectable thereto (also not illustrated).

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. Selectively engageable drive means for a ground engaging wheel mounted upon an axle component and comprising in combination a support bracket, a source of power mounted on said bracket, means rotatable by said source of power, further means on said ground engaging wheel selectively engageable and disengageable with said means rotatable by said source of power, to selectively drive said ground engaging wheel, and means mounting said bracket to said axle component for selective engagement and disengagement of said means rotatable by said source of power, to said further means on said ground engaging wheel, said means mounting said bracket to said axle including means whereby said bracket and said source of power can be raised and lowered relative to said axle component, to engage and disengage said source of power with said ground engaging wheel, said means mounting said bracket to said axle component including a vertically situated, fixed member mounted upon said axle component, said bracket being mounted for slidable vertical movement upon said fixed member and lock means selectively engaging with said fixed member to detachably lock said bracket in the uppermost position with said source of power operatively engaging said ground engaging wheel, said fixed member comprising a shaft, said bracket being journalled upon said shaft for said vertical movement and also for pivotal movement in a substantially horizontal plane, and means detachably restraining said bracket from said pivotal movement.

2. The invention according to claim 1 in which said source of power takes the form of a hydraulic motor operatively connectable to a source of hydraulic fluid under pressure, said means rotated by said hydraulic motor comprising a gear, said further means on said ground engaging wheel including a length of sprocket chain secured adjacent the rim of said ground engaging wheel in a circular configuration concentric with the axis of said wheel and being engaging by said gear.

3. The invention according to claim 1 in which said means detachably restraining said bracket from said pivotal movement includes a retainer plate operatively connected to said axle component and extending upwardly therefrom and engaging one side of said bracket, said plate being pivotally connected to said axle component for movement from a bracket restraining position to a bracket release position and vice-versa.

4. The invention according to claim 2 in which said means detachably restraining said bracket from said pivotal movement includes a retainer plate operatively connected to said axle component and extending upwardly therefrom and engaging one side of said bracket, said plate being pivotally connected to said axle component for movement from a bracket restraining position to a bracket release position and vice-versa.

5. The invention according to claim 1 which includes supporting structure secured to said axle component, said supporting structure including a horizontal member clamped to said axle component inboard of said ground engaging wheel, said means mounting said bracket to said axle component including a vertically situated spindle secured to and extending upwardly from adjacent one end of said horizontal member, said bracket being mounted upon said spindle for vertical movement therealong from a ground engaging wheel driving position to a ground engaging wheel disengaged position and vice-versa.

6. The invention according to claim 2 which includes supporting structure secured to said axle component, said supporting structure including a horizontal member clamped to said axle component inboard of said ground engaging wheel, said means mounting said bracket to said axle component including a vertically situated spindle secured to and extending upwardly from adjacent one end of said horizontal member, said bracket being mounted upon said spindle for vertical movement therealong from a ground engaging wheel driving position to a ground engaging wheel disengaged position and vice-versa.

7. The invention according to claim 5 in which said bracket is mounted upon said spindle for pivotal movement also, in a substantially horizontal plane, when said bracket is in the ground engaging wheel disengaging position, and retaining means extending from said horizontal member and engaging one side of said bracket thereby preventing said bracket from pivoting in said horizontal plane, said retaining means being movable away from said bracket thereby permitting said bracket to pivot in said horizontal plane.

8. The invention according to claim 6 in which said bracket is mounted upon said spindle for pivotal movement also, in a substantially horizontal plane, when said bracket is in the ground engaging wheel disengaging position, and retaining means extending from said horizontal member and engaging one side of said bracket thereby preventing said bracket from pivoting in said horizontal plane, said retaining means being movable away from said bracket thereby permitting said bracket to pivot in said horizontal plane.

9. The invention according to claim 1 in which said further means on said ground engaging wheel comprises an internally toothed gear ring secured adjacent the rim of said wheel and concentric with the axis thereof, said means rotatable by said source of power taking the form of a spur gear selectively engageable with said internally toothed gear.

10. The invention according to claims 1, 3 or 5 in which said further means on said ground engaging wheel comprises an internally toothed gear ring secured adjacent the rim of said wheel and concentric with the axis thereof, said means rotatable by said source of power taking the form of a spur gear selectively engageable with said internally toothed gear.

11. The invention according to claim 7, in which said further means on said ground engaging wheel comprises an internally toothed gear ring secured adjacent the rim of said wheel and concentric with the axis thereof, said means rotatable by said source of power taking the form of a spur gear selectively engageable with said internally toothed gear.

* * * * *